United States Patent [19]
Dietrich

[11] Patent Number: 4,550,800
[45] Date of Patent: Nov. 5, 1985

[54] SHOPPING CART SAFETY BELT
[76] Inventor: Glory A. Dietrich, 8406 Sedan Ave., Canoga Park, Calif. 91304
[21] Appl. No.: 449,406
[22] Filed: Jan. 24, 1983
[51] Int. Cl.$^4$ .................. B62B 9/24; A47D 15/00
[52] U.S. Cl. .................. 182/3; 280/33.99 B; 297/468
[58] Field of Search .................. 182/3; 297/473, 465, 297/468; 280/33.99 B

[56] References Cited
U.S. PATENT DOCUMENTS

| | | | |
|---|---|---|---|
| 157,912 | 12/1874 | Gathright | 182/3 |
| 2,341,117 | 2/1944 | Reinholz | 297/473 |
| 2,888,063 | 5/1959 | Rose | 182/3 |
| 3,306,661 | 2/1967 | Allen | 280/33.99 B |
| 4,108,489 | 8/1978 | Salzman | 280/33.99 B |

Primary Examiner—Reinaldo P. Machado

[57] ABSTRACT

The shopping cart safety belt is a belt with an adjustable loop on one end and a snap hook on the other end. The loop is placed around the child's waist. The snap hook end is brought through the middle bars of the shopping cart back rest and the snap hook is attached to a metal bar on either side of the cart. When the belt is in place, the child is secured into the shopping cart.

1 Claim, 2 Drawing Figures

SHOPPING CART SAFETY BELT

BACKGROUND OF THE INVENTION

The idea of the shopping cart safety belt was conceived when my son was able to sit up in a shopping cart and I saw there was no protection against his falling out. I wanted a simple to use, portable, light-weight device which I could carry with me and which could be applied to any shopping cart. I was unable to purchase such an item since nothing like this was available.

SUMMARY OF THE INVENTION

The present invention is comprised of three principal components: the belt, slide, and snap hook. The belt is 1½" U.S. Government approved seat belt material. The metal slide is easily adjusted but will not slip on the belt when tension is applied to the loop. The snap hook is attached to the side of the cart to securely hold the belt in place.

The features of this design include simplicity, ease of use, portability, and adaption to all types of shopping carts. Prior art that I am aware of through a patent search revealed a collapsible seat for shopping carts. This collapsible seat would be difficult to use, would retail at a price which could make the purchase of such a device prohibitive. Although this collapsible seat is reported as being portable, it is cumbersome and would take up much more room than my shopping cart safety belt. Configuration of my shopping cart safety belt is completely different from the collapsible seat and I feel that my shopping belt's configuration offers advantages above mentioned over the collapsible seat.

Letter A is the metal slide which is adjusted to form a loop to fit to the size of the child.

Letter B is the metal snap hook which when pulled through the middle bars of the back rest hooks to either side of the cart until the loop end fits snugly on the child.

Letter C is the 1½" polypropylene webbing.

FIG. 2

Letter A is the metal slide with the webbing threaded through it. The slide is adjusted to form a loop to fit to the size of the child.

Letter B is the metal snap hook which is stitched to the free end of the webbing. When pulled through the middle bars of the back rest, the snap hook hooks to either side of the cart until the loop end fits snugly on the child.

Letter C is the 1½" polypropylene webbing measuring approximately 36" in length.

Letter D represents the metal rods of the back rest through which the webbing is pulled. These rods are in the middle of the back rest to ensure a snug fit of the webbing around the child.

Letter E is the metal rod on either side of the cart to which the metal snap hook (Letter B) is attached. The metal rod selected for the attachment of the snap hook is dependent on the size of the child and the snugness of fit desired for the child.

Letter F is the seat on which the child sits.

DETAILED DESCRIPTION OF THE INVENTION

Figure 1:
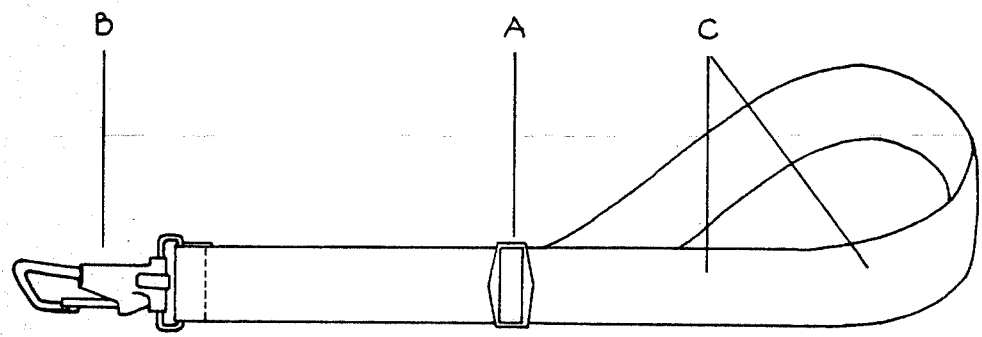
FIG. 1
Figure 2:
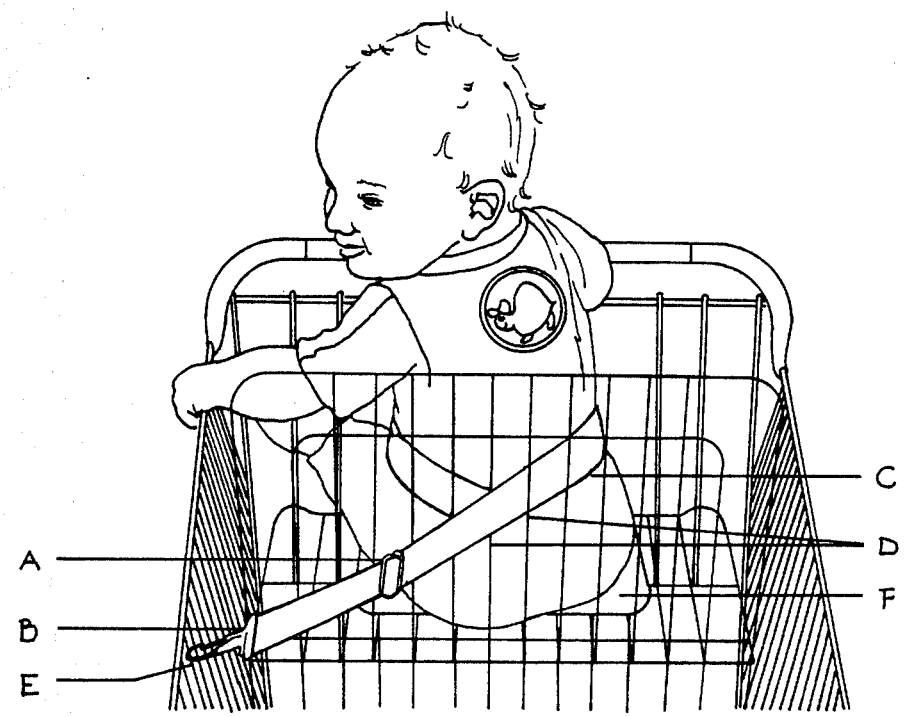

The method of securing a child to a shopping cart having a seat, a back rest and a basket made from heavy gauge wires or rods D, placing the child on the seat, securing a belt loop formed at one end of a safety belt C around the waist of the child as shown in FIG. 2, introducing the other end of the safety belt having a snap hook B between a pair of wires or rods forming the seat back, and fastening the snap fit hook to one of the wires forming the basket and holding the child against the seat back rest.

I claim:

1. The method of securing a child to a shopping cart of the type having a seat forming part of a basket made from heavy wires or rods, wherein said seat includes a back rest, using a safety belt of the type made from a webbing material and having at one end a snap hook and at the other end a slide engaging said webbing at a point intermediate both ends and forming an adjustable loop, placing the child on the seat, placing said loop around the child, inserting the safety belt and part of said loop between a pair of wires or rods forming the seat back, pulling on said safety belt until the child is held firmly against the seat back to ensure a snug fit of the webbing around the child and attaching said snap hook to one of the wires or rods forming said basket.

* * * * *